(12) United States Patent
Morgan

(10) Patent No.: US 6,921,448 B2
(45) Date of Patent: Jul. 26, 2005

(54) IMPREGNATED MICRO-FIBER FILTRATION UNIT

(76) Inventor: H. William Morgan, 100 Anchor Rd., P.O. Box 735, Michigan City, IN (US) 46360

( * ) Notice: Subject to any disclaimer, the term of this patent is extended or adjusted under 35 U.S.C. 154(b) by 366 days.

(21) Appl. No.: 10/214,407

(22) Filed: Aug. 6, 2002

(65) Prior Publication Data

US 2003/0024871 A1 Feb. 6, 2003

Related U.S. Application Data

(63) Continuation of application No. 09/627,985, filed on Jul. 28, 2000, now abandoned.

(51) Int. Cl.[7] ............................................... B32B 31/00
(52) U.S. Cl. ...................... 156/167; 156/169; 156/173; 156/184; 156/185; 156/187; 156/191; 156/276

(58) Field of Search ................................ 156/167, 169, 156/173, 175, 184, 185, 187, 191, 276

(56) References Cited

U.S. PATENT DOCUMENTS

| | | | | |
|---|---|---|---|---|
| 2,413,551 A | * | 12/1946 | Englund | 156/167 |
| 3,904,798 A | * | 9/1975 | Vogt et al. | 55/487 |
| 3,971,373 A | * | 7/1976 | Braun | 128/206.19 |
| 4,726,901 A | * | 2/1988 | Pall et al. | 264/8 |
| 4,948,639 A | * | 8/1990 | Brooker et al. | 428/35.2 |
| 5,039,413 A | * | 8/1991 | Harwood et al. | 55/498 |
| 5,149,468 A | * | 9/1992 | Hershelman | 156/167 |

* cited by examiner

Primary Examiner—Jeff H. Aftergut

(57) ABSTRACT

A blown micro-fiber filtration unit having multiple overlapping layers of fibrous material and an active material applied over said layers. The fibrous material layers being fused together.

9 Claims, 1 Drawing Sheet

IMPREGNATED MICRO-FIBER FILTRATION UNIT

CROSS-REFERENCE TO RELATED APPLICATION

This is a continuation of application Ser. No. 09/627,985, filed Jul. 28, 2000, now abandoned.

SUMMARY OF THE INVENTION

This invention relates to a filtration unit and will have a particular application to a micro-fiber unit of cartridge or bag design having overlapping layers of fibrous material with an active material applied between the layers.

As disclosed in U.S. Pat. Nos. 3,816,304; 4,902,427; 5,389,166; and 5,679,251 filtration units have been manufactured in which an active material has been innerdispersed within the fibrous material. Filtration units of blown micro-fiber material formed into either cartridges or filter bags are economical and extremely efficient. An example of such units is disclosed in U.S. Pat. No. 4,983,292; incorporated herein by reference. Heretofore, though, the introduction of active material in conjunction with such blown micro-fiber units has not occurred. Such active material is generally introduced in powdered or small granular form. When said active material is introduced into the stream of blown micro-fiber, the air stream associated with the micro-fiber disperses the active material, essentially preventing it from being deposited upon the strands of blown fiber.

In this invention, it was discovered that if one diverted in a lateral direction the flow of the fibrous material, the air flow would be interrupted thus permitting the active material to be deposited upon the strands of material prior to reaching the mandrel upon which the filtration unit is formed. In this manner the active material is sandwiched between layers of strands of the fibrous material which are fused together, retaining the active material within the formed filtration unit.

Accordingly, it is an object of this invention to provide a blown micro-fiber filtration unit with inner dispersed active material.

Another object of this invention is to provide a method of forming a micro-fiber blown filtration unit having layered active material.

Still another object of this invention is to provide a filtration unit formed with active material and which is of economical manufacture.

Other objects of this invention will become apparent upon a reading of the following description.

BRIEF DESCRIPTION OF THE DRAWINGS

A preferred embodiment of this invention has been chosen wherein.

DESCRIPTION OF THE PREFERRED EMBODIMENT

Figure 1:
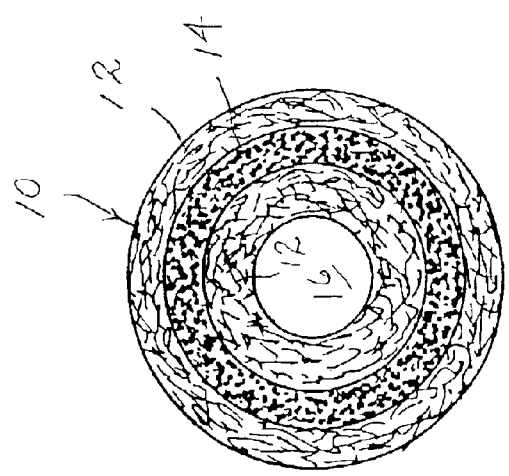
FIG. 1 is a cross-sectional view of the filtration unit showing the active material layered within the unit.

Filtration unit 10, shown in cross-section view in FIG. 1, includes multiple overlapping fused layers of base material 12 within which in layered form is an active material 14. Unit 10 is illustrated in the drawings is of cylindrical form and is known in the trade as a cartridge filter. It is to be understood, though, that this invention would have application also to bag type filters. Unit 10 has an open core 16. The outer most and inner most layers of unit 10 are preferably formed only of the base material so as to form a seal for the active material 14 which is interdispersed within or sandwiched between layers of the base material within the central portions of the unit. Base material 12 is preferably blown micro-fiber such as polypropylene. Active material 14 may constitute a variety of chosen substances depending upon the intended use of the filtration unit such as for irrigation and fertilization purposes, sterilization purposes, or cleansing purposes. For example, for water filtration, the active material may be carbon particles.

Figure 2:
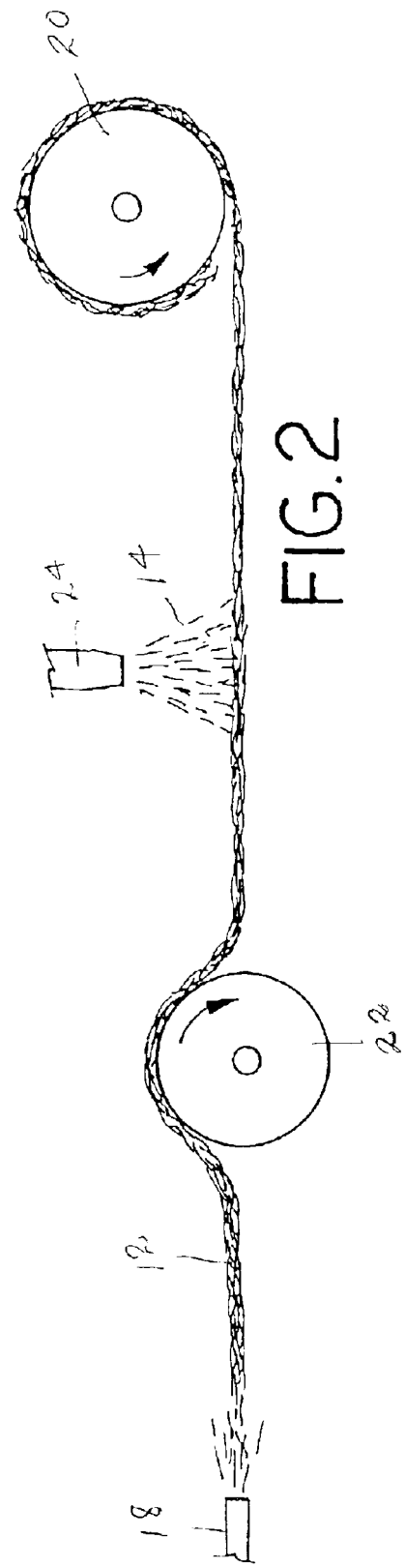
FIG. 2 is a side view showing the filtration unit of FIG. 1 being formed.

FIG. 2 illustrates a method of manufacturing the filtration unit of FIG. 1. A nozzle 18 and a mandrel 20 are provided. Normally in the manufacture of cartridge filters, liquified, molded base material is blown from nozzle 18 into multiple elongated strands which are wound upon mandrel 20. As the strands in their heated form are wound about mandrel 20, there is intermittent adherence between the stands. This allows for the porous nature of the filtration unit. Once the desired thickness of the material upon mandrel 20 has been reached, flow of the stands of the material through nozzle 18 is terminated and the wound overlapping fibrous unit is removed from the mandrel. An elongated unit is then cut into longitudinal sections of desired length and appropriately packaged.

In this invention the path of the blown base material 12 is interrupted by being displaced laterally such as by means of roller 22. This displacement of the base material as it is emitted from nozzle 18 breaks or diverts the flow of air which accompanies the strands of base material. A dispensing nozzle 24 located between roller 22 and mandrel 20 deposits, such as by gravity or other means, active material 14 upon the stands of base material 12 in layered form. The controlled flow of the active material 14 as it is deposited upon the strands of base material is not disturbed or interrupted by the air flow from nozzle 18 due to the diversion of the strand of material caused by roller 22. The base material 12 with its layer of active material 14 is then wound upon mandrel 20 causing the active material to be captured between the adhering layers of the base material as they are cooled upon mandrel 20. Normally, the filtration unit 10 would be formed by first winding several layers of base material 12 upon the mandrel and thereafter introducing active material 14. Introduction of active material 14 upon the strands of the base material would be terminated just prior to reaching the final diameter of the filtration unit to allow several strands of only the base material to be wound upon the outer layer of the unit. In this manner the active material would be confined between pure layers of base material which base material could function as a pre-filter.

To package unit 10 which is of elongated cylindrical shape, shrink-wrapped plastic can be applied over the elongated cylindrical unit 10 prior to or subsequent to its removal from mandrel 20. Thereafter, once the unit has been removed from mandrel 20 it will be cut into specific lengths. In this manner the outside of the filtration unit will be maintained in a clean manner with no migration of the active material to the exterior of the unit.

The above subject invention is not to be limited to the details above given but may be modified within the scope of the appended claims.

I claim:

1. A method of manufacturing a filtration unit comprising the steps:
   a. providing a liquid base material,
   b. forming through a nozzle said base material into multiple intermingling elongated strands,
   c. winding said strands upon a mandrel in an overlapping self-adhering manner to form a filtration unit,
   d. laterally diverting said strands relative to the direction of strand flow from said nozzle at a location between said nozzle and said mandrel, and
   e. depositing an active material upon said strands between said location and said mandrel.

2. The method of claim 1 wherein said active material is carbon.

3. The method of claim 2 wherein said base material is a plastic.

4. The method of claim 3 wherein said base material is polypropylene.

5. The method of claim 1 wherein step e produces said filtration unit of elongated cylindrical form, thereafter wrapping said filtration unit while upon said mandrel in a covering, removing said wrapped filtration unit from the mandrel and cutting said wrapped unit into components of selected length.

6. A method of manufacturing a filtration unit comprising the steps:
   (a) providing a liquid base material,
   (b) propelling said base material through a nozzle by air flow into multiple intermingling elongates strands,
   (c) winding said strands upon a mandrel in an overlapping self-adhering manner to form a filtration unit,
   (d) interrupting said air flow upon exiting said nozzle at a location between said nozzle and said mandrel, and
   (e) depositing an active material upon said strands between said location and said mandrel.

7. A method of manufacturing a filtration unit comprising the steps:
   (a) providing a liquid base material,
   (b) forming through a nozzle said base material into multiple intermingling elongated strands,
   (c) winding said strands upon a mandrel in an overlapping self-adhering manner to form a filtration unit,
   (d) laterally diverting said strands relative to the direction of strand flow from said nozzle at a location between said nozzle and said mandrel with its overlapping strands, and
   (e) depositing an active material upon said strands between said location and said mandrel with its overlapping strands.

8. The method of claim 7 wherein step (c) produces said filtration unit of elongated cylindrical form, thereafter wrapping said filtration unit while upon said mandrel in a covering, removing said wrapped filtration unit from the mandrel and cutting said wrapped unit into components of selected length.

9. A method of manufacturing a filtration unit comprising the steps:
   (a) providing a liquid base material,
   (b) propelling said base material through a nozzle by air flow into multiple intermingling elongated strands,
   (c) winding said strands upon a mandrel in an overlapping self-adhering manner to form a filtration unit,
   (d) interrupting said air flow upon exiting said nozzle at a location between said nozzle and said mandrel with its overlapping strands, and
   (e) depositing an active material upon said strands between said location and said mandrel with its overlapping strands.

* * * * *